United States Patent [19]
Barcewski

[11] Patent Number: 5,157,843
[45] Date of Patent: Oct. 27, 1992

[54] HIGH ACCURACY SELF-SETTING PLUMB BOB WITH SLIDE HAMMER

[76] Inventor: Jack Barcewski, 585 Woodbine Dr., San Rafael, Calif. 94903

[21] Appl. No.: 761,560

[22] Filed: Sep. 18, 1991

Related U.S. Application Data

[63] Continuation-in-part of Ser. No. 672,500, Mar. 20, 1991, abandoned.

[51] Int. Cl.⁵ ............................................. G01C 15/10
[52] U.S. Cl. ........................................ 33/392; 33/332; 33/666
[58] Field of Search ................. 33/332, 339, 353, 392, 33/574, 579, 666, 393, 394

[56] References Cited

U.S. PATENT DOCUMENTS

| | | | |
|---|---|---|---|
| 668,998 | 2/1901 | Napier | 33/392 |
| 995,872 | 6/1911 | Joice | 33/392 |
| 1,025,828 | 5/1912 | Paul | 33/392 |
| 1,178,835 | 4/1916 | Berg | 33/392 |
| 1,745,027 | 1/1930 | Oxford | 33/392 |
| 2,318,698 | 8/1945 | Sireci | 33/392 |
| 2,523,351 | 9/1956 | Armstrong | 33/392 |
| 2,795,053 | 6/1957 | Wohlstrom | 33/392 |
| 2,803,067 | 8/1957 | Kurschner | 33/332 |
| 3,016,616 | 1/1962 | Matson | 33/332 |
| 3,113,387 | 12/1963 | Bean | 33/392 |
| 4,461,091 | 7/1984 | Gammon | 33/392 |
| 4,853,376 | 11/1992 | Fuller | 33/392 |

FOREIGN PATENT DOCUMENTS 1946297  3/1971  Fed. Rep. of Germany .
12345  of 1902  United Kingdom .

Primary Examiner—Allan N. Shoap
Assistant Examiner—Alvin Wirthlin
Attorney, Agent, or Firm—Townsend and Townsend

[57] ABSTRACT

A plumb bob capable of marking either soft or hard surfaces is disclosed. A chalk reservoir can be attached to the bob for marking hard surfaces. Removing the chalk reservoir enables the user to insert a metal stake or headless nail into the bob, where it is held by magnetic force. Also disclosed is a slide hammer assembly that helps drive the stake into the surface. When the stake penetrates soft surfaces, its resistance to removal is greater than the magnetic force holding it in the bob and it remains as a plumb line mark when the bob is removed.

12 Claims, 3 Drawing Sheets

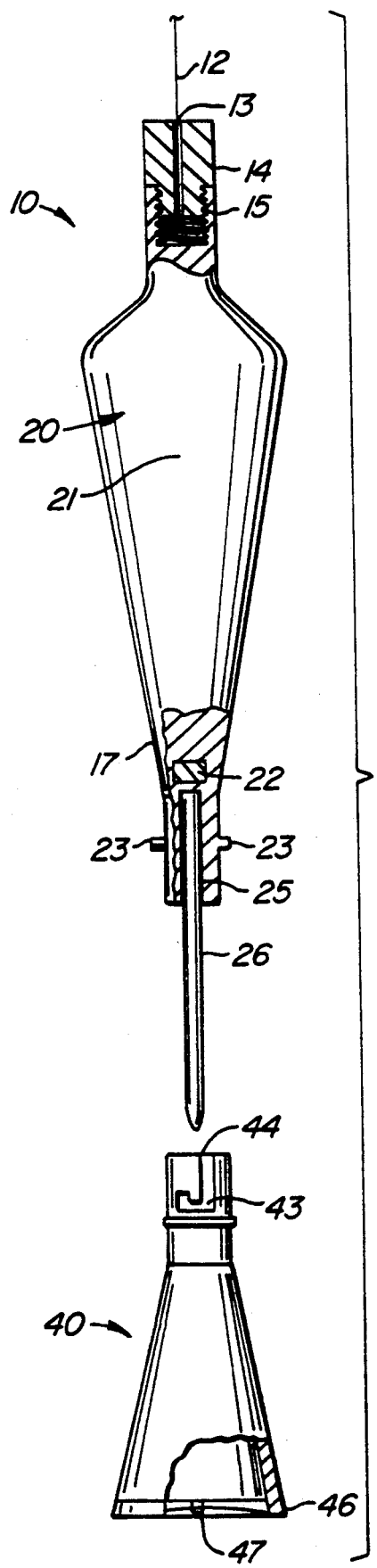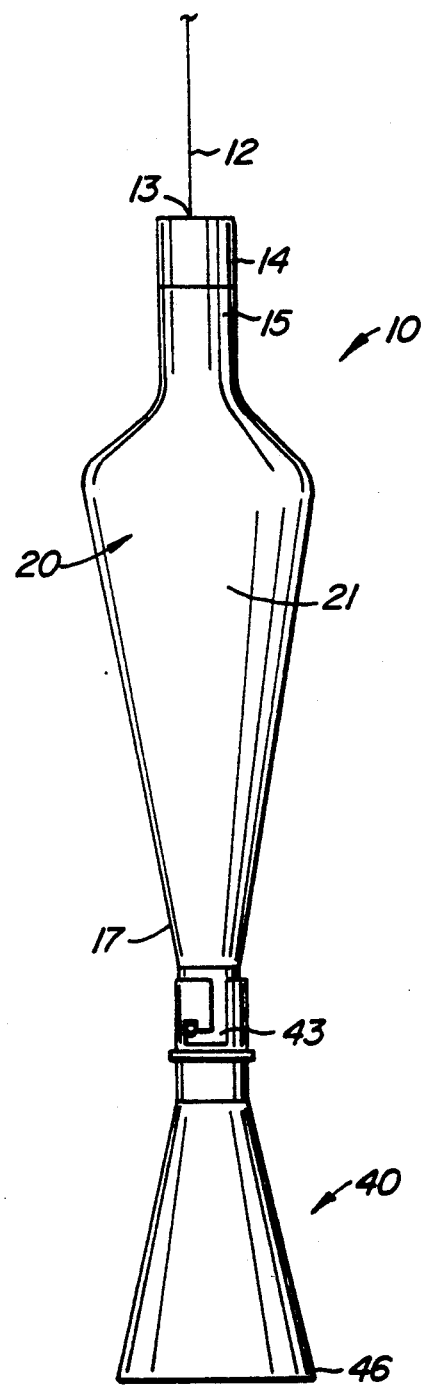
FIG. 1.
FIG. 2.

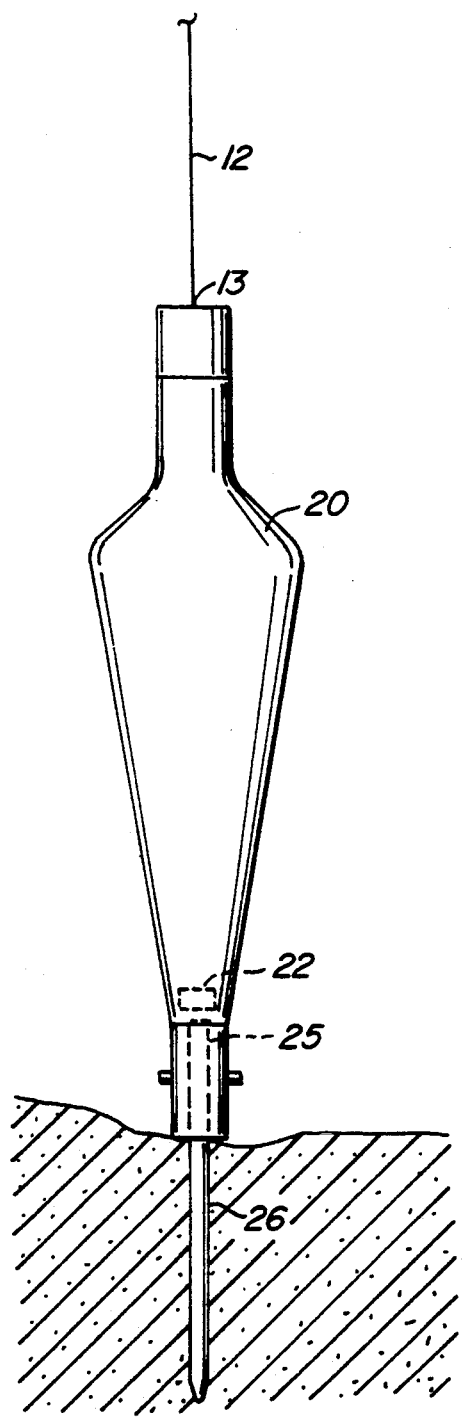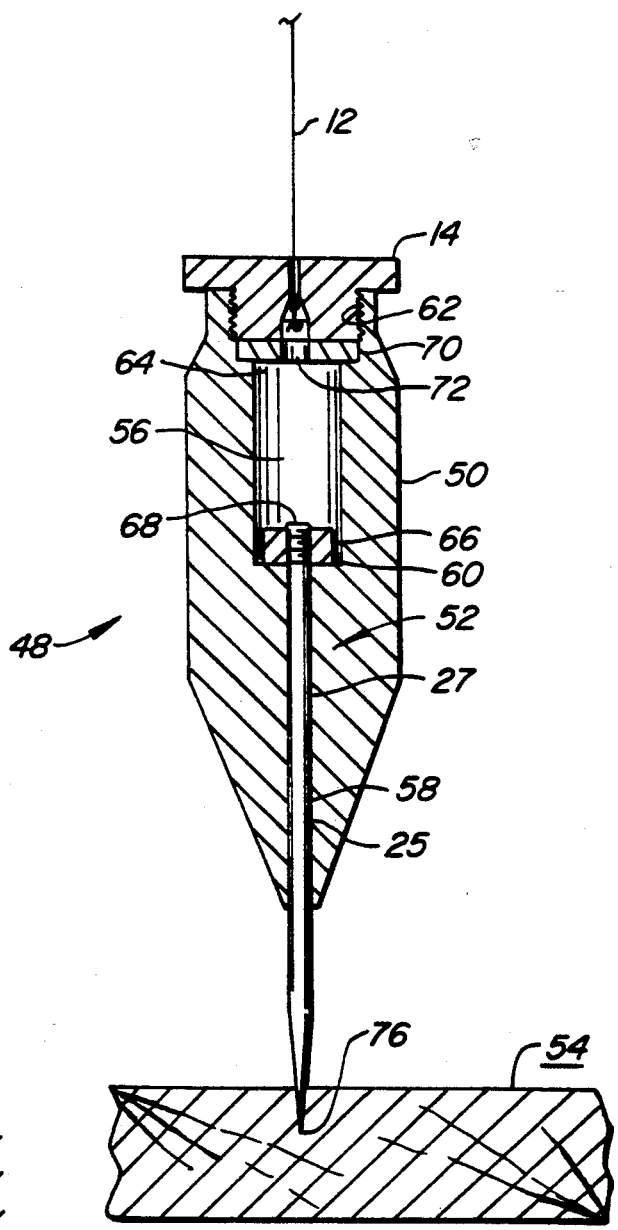
FIG. 3.
FIG. 4.

HIGH ACCURACY SELF-SETTING PLUMB BOB WITH SLIDE HAMMER

CROSS REFERENCE TO RELATED APPLICATIONS

This application is a continuation-in-part of Ser. No. 07/672,500, filed Mar. 20, 1991, now abandoned.

BACKGROUND OF THE INVENTION

This invention relates to plumb bobs.

Plumb bobs having a marking capability are known. Such bobs contain either chalk or a marking fluid which, when the bob is used, mark the point where the plumb line has been set. Although such bobs can be used over or on relatively clean, hard-surfaced materials such as concrete, where the chalk or liquid mark will be easily visible, they are less useful over such surfaces as dirt or sand, where the mark may be hard to see or insufficiently durable.

A plumb bob that can leave a visible, long-lasting mark on any type of surface or material is desirable in view of the limitations of existing plumb bobs.

SUMMARY OF THE INVENTION

One aspect of the present invention is directed to a plumb bob that can very accurately mark a surface with a releasable pin or stake, which is driven into the surface when the bob is used. In one embodiment the stake is metal and magnetically-held so as to be releasable. A slide hammer assembly may be disposed inside the bob and allows the stake to be driven into the surface without lifting the tip of the stake from the surface, significantly improving accuracy and allowing stakes to be used with harder materials than would otherwise be practical. This is useful both for releasable stakes and for nonreleasable stakes. In one embodiment highly uniform stakes are used and mounted to the plumb in an extremely close fitting bore, so as to limit lateral movement and increase accuracy.

Another aspect of the present invention is directed to a plumb bob that can leave a readily visible, durable mark on any surface or material. When a hard-surfaced material such as concrete is being marked, a chalk-filled reservoir is coupled to the plumb bob, the chalk leaving an easily visible mark when used with the bob. If the material to be marked is a soft surface such as sand or dirt, or even materials such as wood, the bob is used with a stake, which is driven into the surface when the bob is used.

the present invention will now be described in detail, with reference to the figures listed and described below.

BRIEF DESCRIPTION OF THE DRAWINGS

FIG. 1 illustrates the components of a plumb bob according to one aspect of the present invention;

FIG. 2 illustrates how one embodiment is used to mark a plumb line on a hard surface material;

FIG. 3 illustrates how a different configuration of the embodiment of FIG. 2 is used to mark a plumb line on a soft surface material;

FIG. 4 illustrates one particular embodiment constructed with a slide hammer assembly.

DESCRIPTION OF SPECIFIC EMBODIMENTS

Dual Marking

Figure 5:
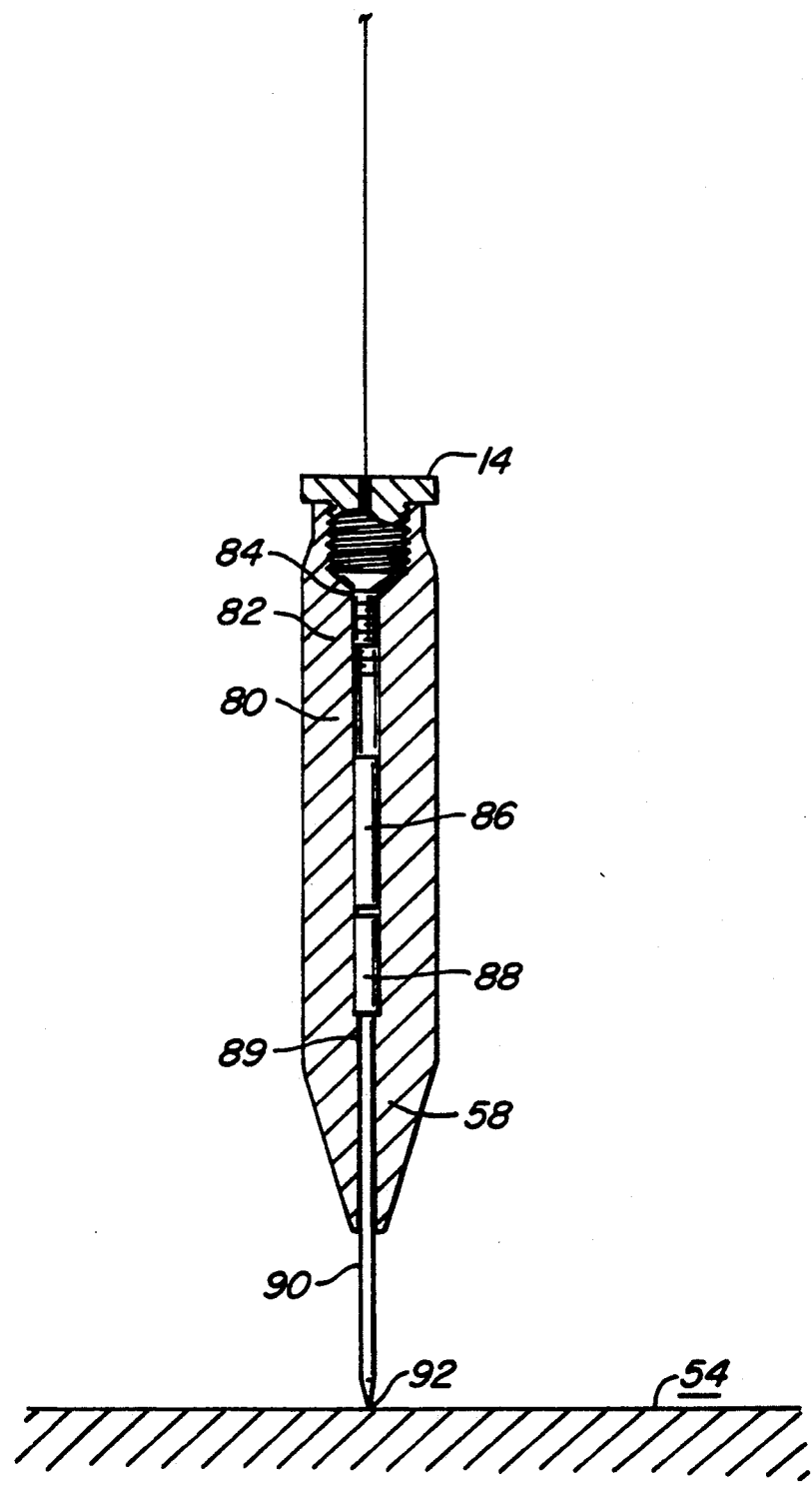
FIG. 5 illustrates another particular embodiment constructed with a slide hammer assembly for releasable stakes.

As shown in FIG. 1, plumb bob 10 is comprised of plumb bob means or body 20 and chalk reservoir 40. In this embodiment bob 10 is fabricated from brass, but other materials could be used without changing the present invention in any significant way, as long as the materials chosen were of sufficient weight and durability to function in an acceptable manner.

Plumb line 12 is attached to the top of bob 10 by being passed through hole 13 formed in the center of removable plug 14 and knotting or otherwise fastening line 12 so it cannot slip back through hole 13. Plug 14 screws into screw threads 15 cut into the hollow inner surface of section 20. A portion of the interior of section 20 is hollow, with magnet 22 disposed and seated at the bottom of interior chamber 21. The exterior of section 20 can be roughened over its central portion to ease handling. Attachment pins 23, protruding from the sides of section 20, provide a mounting means for chalk reservoir 40. Forward end 17 of section 20 is conical, with a hole 25 drilled through the core's central axis. Metal pin, or stake, 26 is inserted into hole 25 and held therein by magnet 22.

Chalk reservoir 40, in a particular embodiment, is conical in shape, hollow, and can be detachably mounted on section 20 by means of slots 43. Slots 43 engage with pins 23 in a known manner to couple section 20 and reservoir 40 together. As with section 20, the exterior of reservoir 40 can be roughened for easy handling. The interior of reservoir 40 is filled with chalk through an opening at end 44. End 46 has a central "x" 47 cut therein, through which the chalk is dispensed during use. The center of end 46 is recessed with about a ⅛ inch lip. When the plumb bob is used to mark hard surfaces such as concrete, chalk reservoir 40 is mounted on section 20 using slots 43 and pins 23. The plumb can then be used in a known manner, as illustrated in FIG. 2.

As shown in FIG. 3, when a soft or medium hard surface is to be marked, reservoir 40 is removed. Plastic caps (not shown) mount on both ends of the reservoir to prevent chalk spillage during non-use. Stake 26 is held within hole 25 by magnet 22. In one embodiment, a long #16 or #20 nail with its head cut off is used as stake 26. In another embodiment, specially machined plumb stakes are used as stake 26. These machined stakes have a diameter about only three one-thousandths of an inch play within hole 25, as compared to a play of about ten one-thousandths of an inch difference for nails (which is necessary due to nonuniformity in nails). Reducing the play increases accuracy. After the bob has been dropped, and stake 26 embedded in the surface, gently pulling up on section 20, using line 12, will cause magnet 22 to release stake 26, which then serves as the plumb mark.

Slide Hammer

When implanting a stake with the plumb bob of FIG. 3, the plumb bob must be lifted from contact with the surface and then dropped so as to have momentum to implant the stake. An exception is with extremely soft surfaces for which the simple weight of the bob suffices. Because the bob may stray as it is being dropped, this decreases its accuracy. Shown in FIG. 4 is a plumb bob 48 including a body 50 and a slide hammer assembly 52, slidably mounted within body 50, that helps accurately drive stakes into harder surfaces such as wood surface 54.

Body 50 is hollow along its length and includes a slide bore 56 that opens into a smaller diameter guide hole 58 at one end 60 and a larger diameter threaded bore 62 at the other end 64. Nonreleasable stake 27 is partially disposed within hole 58, and its interior end is secured within bore 56 by a nut 66 screwed onto threads 68 on stake 27. Plug 14 is secured to body 50 by being screwed into bore 62. Plug 14 has a washer 70 disposed at its base. Washer 70 helps prevent the hammering action, described below, from deforming plug 14. Washer 70 also provides a gap 72 within which the knotted end of string 12 may lie so that the knot does not cushion and absorb any of the hammer force. A slug could also be used in place of washer 70 and perform the same functions.

When plumb bob 48 is used, it is lowered until tip 76 of stake 27 just touches surface 54 to be marked. This holds tip 76 still with the body in a raised position. Then, body 50 is dropped to a lowered position. Nut 66 and the end of stake 27 strike washer 70, and the momentum of moving body 50 drives stake 27 into surface 54. For harder surfaces this process can be repeated without removing stake 27 from the surface, to drive the stake in deeper. A person may then go to plumb bob 48, which serves as a conspicuous and well fixed mark, and replace it with a more convenient permanent marker such as a nail or a pencil mark.

The slide hammer mechanism of this aspect of the present invention may also be adapted for use with releasable stakes, as illustrated in FIG. 5. In this embodiment slide bore 80 contains a threaded portion 82 within which is disposed allen screw 84, which may be positioned as desired to adjust the effective length of slide bore 80. Also within slide bore 80 is slide weight 86, below which is sliding magnet 88, which secures an upper portion 89 of releasable stake 90 within guide hole 58, which has a smaller diameter than slide bore 80. Operation is much the same as with the plumb bob of FIG. 4. The tip 92 of stake 90 is positioned, then body 50' is dropped, lifted, dropped, etc. As it is dropped, stake 90 slides into bore 80 until slide weight 86 strikes screw 84. Once stake 90 is implanted, the plumb bob may be lifted and magnet 88 will release stake 90, leaving it as a plumb line marker. Slide weight 86 acts as a spacer and may be of brass to help prevent the magnetic field of magnet 88 from interacting with the allen screw. All of the slide assembly, slide weight 86 and magnet 88, may be removed once plug 14 and allen screw 84 have been removed. In a median position of screw 84, the distance between the raised and lowered positions of the body is about one and one quarter inches. Adjustment of screw 84 is primarily to account for differences in the surface to be marked. Increasing the length of the slide chamber, and therefore the distance between the raised and lowered positions, increases the hammering force with which the stake is driven into the surface, but also reduces the depth to which stake 27 can be driven, due to body 50' striking the surface. The opposite adjustment can be made to increase the penetration depth of stake 27, which is helpful with the loose soil of casons.

As will be obvious to one familiar with this field, many variations in materials and exact shapes are possible. Reservoir 40 might be screwably fastened to section 20 or have a different shape, and different materials could be used to manufacture the bob. Plug 14 might be a press fitting as opposed to a screw fitting, and it could have a recess on the inside to contain the knotted end of string 12. Stake 26 could be secured to end 17 by friction instead of by magnet 22. Stake 27 could be secured within bore 56 by a snap ring engaged with a groove on the end of stake 27. Reservoir 40 could be secured to ferrule 14 and stake 26 could be releasably mounted to a bracket pivotally mounted to reservoir 40 so that stake 26 could be pivoted down into position only when needed; this would eliminate the need to completely separate reservoir 40 when stake 26 is to be used. Also, stake 26 could be replaced by a non-piercing marker by using a push-to-release type of catch to secure the marker to the remainder of the bob. Given the range of modifications possible to the present invention, which modifications would not change the scope of the invention, it is intended that the invention not be limited to the particular embodiment disclosed, but that all embodiments falling within the scope of the appended claims be included.

What is claimed is:

1. A plumb bob comprising:
a body having an upper suspension end, a lower marking end and a central axial bore extending form an opening at the marketing end, said bore having a first diameter in a middle portion, and having a second diameter in a lower portion at the marking end, said second diameter being smaller than said first diameter; and
a slide hammer assembly slidably disposed in the middle bore portion and having a diameter larger than said second diameter, said slide hammer assembly also comprising means for securing a stake within the lower bore, wherein said body has a striking surface located at an upper end of said middle bore portion adapted to strike against an upper surface of said slide hammer assembly when said body is dropped from a raised axial position.

2. The plumb bob of claim 1, wherein the axial bore has an upper threaded portion, and wherein said striking surface comprises an adjustable screw disposed in the upper bore portion, whereby said adjustable screw adjustably limits movement of the slide assembly.

3. The plumb bob of claim 2, wherein said slide hammer assembly comprises a brass cylinder disposed above the securing means, and wherein the securing means releasably magnetically secures a ferromagnetic stake within the lower bore.

4. The plumb bob of claim 1, wherein the stake has a threaded end disposed in the bore and wherein the securing means comprises a nut fastened to the stake.

5. The plumb bob of claim 1 wherein said securing means releasably secures the stake.

6. The plumb bob of claim 5 wherein the stake is ferromagnetic and wherein the releasably securing means magnetically secures the stake.

7. The plumb bob of claim 5 wherein the stake has a third diameter, and wherein the second diameter is less than 10 thousandths of an inch greater than the third diameter.

8. A plumb bob for marking a surface, comprising:
a body having an upper suspension end, a lower marking end and a central axial bore extending from an opening at the lower end;
a slide hammer assembly slidably mounted within the central bore for axial movement of the body between raised and lowered positions relative to the slide hammer assembly, the slide hammer assembly including an elongated stake having an upper end within the central bore and a lower end external to the central bore; and means located on the body for striking the drive hammer assembly, thereby driving the stake into the surface as the body is dropped from the raised axial position to the lowered axial position.

9. The plumb bob of claim 8, wherein the raised axial position is about one and one fourth inches higher than the lowered axial position.

10. A plumb bob comprising:
a body having an upper suspension end, a lower marking end and a central axial bore extending from an opening at the marking end, said bore having a threaded upper portion;
a slide hammer assembly slidably disposed in the bore, said slide hammer assembly also comprising means for securing an implantable marker within the bore; and
an adjustable screw disposed in the upper bore portion, whereby said adjustable screw adjustably limits movement of the slide hammer assembly.

11. The plumb bob of claim 1, wherein said implantable marker is a ferromagnetic stake, wherein said slide hammer assembly further comprises a brass cylinder disposed above the securing means, and wherein the securing means releasably magnetically secures the stake with the bore.

12. A plumb bob comprising:
a body having an upper suspension end, a lower marking end and a central axial bore extending from an opening at the marking end, said bore having a first diameter in a middle portion, and having a second diameter in a lower portion at the marking end, said second diameter being smaller than said first diameter; and
a slide hammer assembly slidably disposed in the middle bore portion and having a diameter larger than said second diameter, said slide hammer assembly comprising means for securing an implantable marker within the lower bore, wherein the implantable marker has a threaded end disposed in the middle bore portion and wherein the securing means comprises a nut fastened to the threaded end of the implantable marker.

* * * * *